United States Patent
Faletti (12)

(10) Patent No.: US 6,351,946 B1
(45) Date of Patent: Mar. 5, 2002

(54) EXHAUST GAS RECIRCULATION SYSTEM IN AN INTERNAL COMBUSTION ENGINE

(75) Inventor: James J. Faletti, Spring Valley, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/405,786

(22) Filed: Sep. 27, 1999

(51) Int. Cl.⁷ .............................................. F02B 33/44
(52) U.S. Cl. ........................................ 60/605.2; 60/612
(58) Field of Search ................. 60/605.2, 612

(56) References Cited

U.S. PATENT DOCUMENTS

| | | | | |
|---|---|---|---|---|
| 4,215,550 A | * | 8/1980 | Dinger et al. ............... | 60/605.2 |
| 4,231,225 A | | 11/1980 | Aya | |
| 4,927,336 A | | 5/1990 | Rossmann et al. | |
| 5,205,265 A | | 4/1993 | Kashiyama et al. | |
| 5,611,202 A | * | 3/1997 | Sumser et al. ............... | 60/605.2 |
| 5,617,726 A | | 4/1997 | Sheridan et al. ............ | 60/605.2 |
| 5,740,786 A | * | 4/1998 | Gartner ....................... | 60/605.2 |
| 5,771,867 A | | 6/1998 | Amstutz et al. | |
| 5,771,868 A | | 6/1998 | Khair .......................... | 123/570 |
| 5,785,030 A | | 7/1998 | Paas ............................ | 60/278 |
| 5,937,650 A | * | 8/1999 | Arnold ........................ | 60/605.2 |
| 5,937,651 A | * | 8/1999 | Braun et al. ................. | 60/605.2 |
| 6,041,602 A | * | 3/2000 | Dickey ........................ | 60/605.2 |
| 6,062,026 A | * | 5/2000 | Woollenweber ............. | 60/605.2 |
| 6,145,313 A | * | 11/2000 | Arnold ........................ | 60/605.2 |

FOREIGN PATENT DOCUMENTS

EP         0953743 A2 *  4/1999  ................. 60/605.2

* cited by examiner

*Primary Examiner*—Thomas Denion
*Assistant Examiner*—Thai-Ba Trieu
(74) *Attorney, Agent, or Firm*—Taylor & Aust, P.C.

(57) ABSTRACT

An internal combustion engine includes at least one exhaust manifold and at least one intake manifold. A turbocharger includes a turbine, a first compressor and a second compressor. The turbine is connected with the exhaust manifold and has a controllable variable nozzle. The first compressor and the second compressor each are connected with and driven by the turbine. The first compressor has an inlet for receiving combustion air and an outlet. The second compressor has an inlet connected with each exhaust manifold and an outlet. A mixer interconnects the first compressor outlet and the second compressor outlet with the intake manifold. A controller is connected with and controls operation of the turbine variable nozzle, dependent upon an operating characteristic associated with the second compressor.

16 Claims, 1 Drawing Sheet

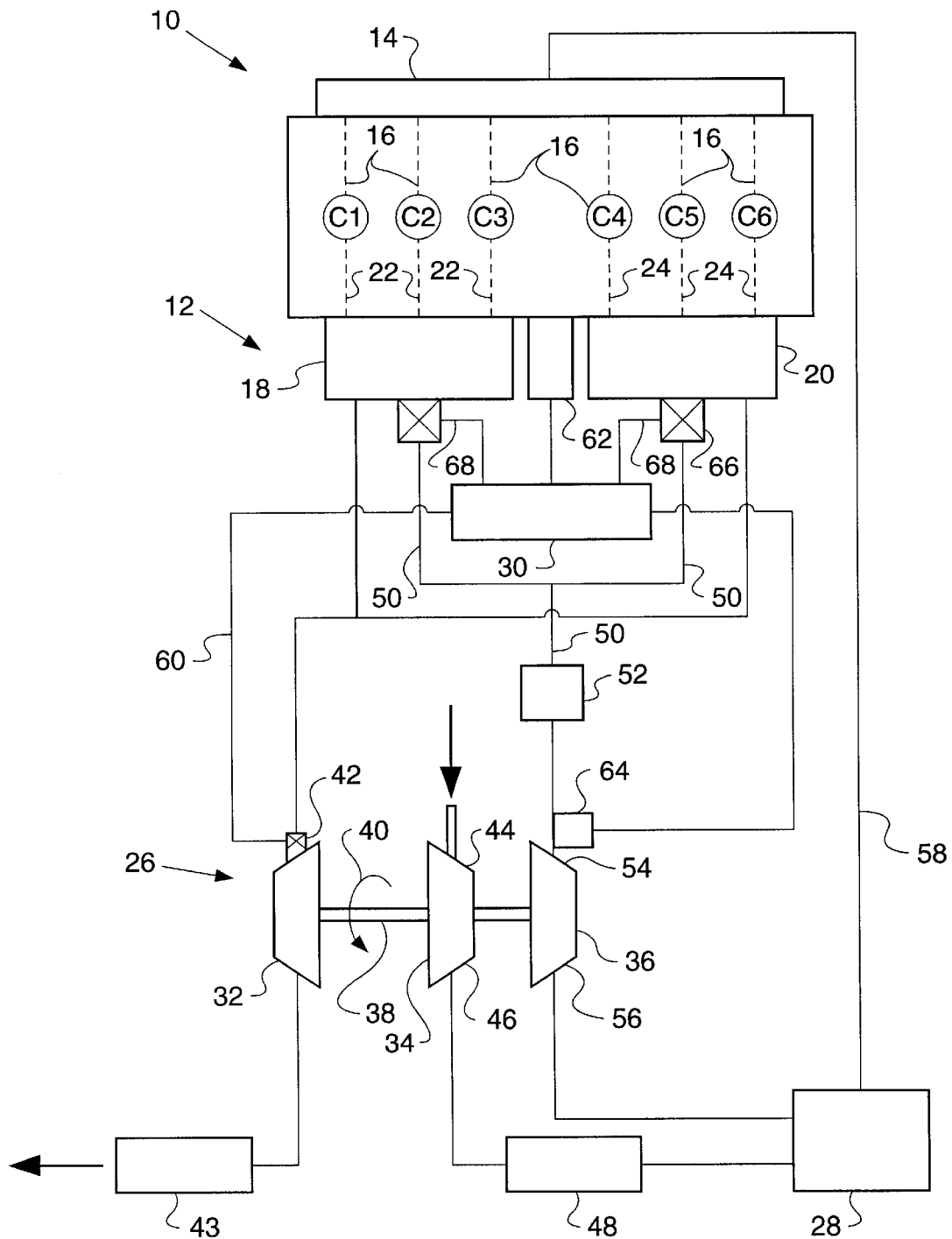

EXHAUST GAS RECIRCULATION SYSTEM IN AN INTERNAL COMBUSTION ENGINE

TECHNICAL FIELD

The present invention relates to an exhaust gas recirculation system in an internal combustion engine, and, more particularly, to an exhaust gas recirculation system having a turbocharger with two compressor wheels and a turbine having a variable intake nozzle.

BACKGROUND ART

An exhaust gas recirculation (EGR) system is used for controlling the generation of undesirable pollutant gases and particulate matter in the operation of internal combustion engines. Such systems have proven particularly useful in internal combustion engines used in motor vehicles such as passenger cars, light duty trucks, and other on-road motor equipment. EGR systems primarily recirculate the exhaust gas by-products into the intake air supply of the internal combustion engine. The exhaust gas which is reintroduced to the engine cylinder reduces the concentration of oxygen therein, which in turn lowers the maximum combustion temperature within the cylinder and slows the chemical reaction of the combustion process, decreasing the formation of nitrous oxides ($NO_x$). Furthermore, the exhaust gases typically contain unburned hydrocarbons which are burned on reintroduction into the engine cylinder, which further reduces the emission of exhaust gas by-products which would be emitted as undesirable pollutants from the internal combustion engine.

When utilizing EGR in a turbocharged diesel engine, the exhaust gas to be recirculated is preferably removed upstream of the exhaust gas driven turbine associated with the turbocharger. In many EGR applications, the exhaust gas is diverted directly from the exhaust manifold. Likewise, the recirculated exhaust gas is preferably reintroduced to the intake air stream downstream of the compressor and air-to-air after cooler (ATAAC). Reintroducing the exhaust gas downstream of the compressor and ATAAC is preferred due to the reliability and maintainability concerns that arise if the exhaust gas passes through the compressor and ATAAC. An example of such an EGR system is disclosed in U.S. Pat. No. 5,802,846 (Bailey), which is assigned to the assignee of the present invention.

It is also known to provide a turbocharger with a single turbine wheel and two compressor wheels. The turbine wheel is mechanically coupled with and rotatably drives each of the compressor wheels. One of the compressor wheels is used to compress combustion air received from the ambient environment, and the other compressor wheel is used to compress exhaust gas received from an exhaust manifold. By compressing the exhaust gas, the exhaust gas may be effectively mixed with the combustion air for recirculation to the intake manifold of the internal combustion engine.

Dependent upon certain operating conditions associated with the diesel engine, it may be desirable to provided a richer or leaner mixture of the exhaust gas within the combustion air which is transported to the intake manifold. One known technique for controlling the amount of exhaust gas which is mixed with the combustion air utilizes controllably actuatable valves which interconnect the exhaust manifold with the compressor which receives the exhaust gas. The flow of exhaust gas to the second compressor can be completely shut off, or can be controlled on a timed basis to provide a desired average flow of exhaust gas which mixes with the combustion air. Another known technique is to provide a bypass fluid conduit associated with the combustion air or exhaust gas. A controllably actuatable butterfly valve or the like is positioned within the bypass fluid conduit and controlled to in turn control the amount of exhaust gas which mixes with the combustion air. Although such systems are effective to control exhaust gas recirculation within the diesel engine, they usually require that additional structure in the form of sensors, conduits, valves and associated controllers be added to the internal combustion engine.

The present invention is directed to overcoming one or more of the problems as set forth above.

DISCLOSURE OF THE INVENTION

In one aspect of the invention, an internal combustion engine comprises at least one exhaust manifold and at least one intake manifold. A turbocharger includes a turbine, a first compressor and a second compressor. The turbine is connected with the exhaust manifold and has a controllable variable nozzle. The first compressor and the second compressor each are connected with and driven by the turbine. The first compressor has an inlet for receiving combustion air and an outlet. The second compressor has an inlet connected with each exhaust manifold and an outlet. A mixer interconnects the first compressor outlet and the second compressor outlet with the intake manifold. A controller is connected with and controls operation of the turbine variable nozzle, dependent upon an operating characteristic associated with the second compressor.

In another aspect of the invention, an exhaust gas recirculation system in an internal combustion engine including an exhaust manifold and an intake manifold comprises a turbocharger with a turbine, a first compressor and a second compressor. The turbine is configured for connection with the exhaust manifold and has a controllable variable nozzle. The first compressor and the second compressor each are connected with and driven by the turbine. The first compressor has an inlet for receiving combustion air and an outlet. The second compressor has an inlet configured for connection with the exhaust manifold and an outlet. A mixer is connected with each of the first compressor outlet and the second compressor outlet. A controller is connected with and controls operation of the turbine variable nozzle, dependent upon an operating characteristic associated with the second compressor.

In yet another aspect of the invention, a method of operating an exhaust gas recirculation system in an internal combustion engine comprises the steps of: providing an exhaust manifold and an intake manifold; providing a turbocharger including a turbine, a first compressor and a second compressor, the turbine configured for connection with the exhaust manifold and having a controllable variable nozzle, the first compressor and the second compressor each being connected with and driven by the turbine, the first compressor having an inlet for receiving combustion air and an outlet, the second compressor having an inlet connected with the exhaust manifold and an outlet; providing a controller connected with the turbine variable nozzle; flowing exhaust gas from the exhaust manifold to each of the turbine variable nozzle and the second compressor inlet; and controlling operation of the turbine variable nozzle, dependent upon an operating characteristic associated with the second compressor.

BRIEF DESCRIPTION OF THE DRAWING

The sole FIGURE is a schematic illustration of an embodiment of an exhaust gas recirculation system of the present invention in an internal combustion engine.

BEST MODE FOR CARRYING OUT THE INVENTION

Referring now to the drawing, there is shown an internal combustion engine 10 including an embodiment of an exhaust gas recirculation system 12 of the present invention. Internal combustion engine 10 is a diesel engine including a plurality of combustion cylinders in which combustion occurs during operation. In the embodiment shown, internal combustion engine 10 includes six combustion cylinders C1–C6. Each combustion cylinder C1–C6 is in communication with and receives combustion air from an intake manifold 14, as represented by dashed lines 16. Although internal combustion engine 10 is shown with a single intake manifold 14, it is to be appreciated that multiple intake manifolds may also be provided. Each combustion cylinder C1–C6 is also in communication with and provides exhaust gas to an exhaust manifold 18 or 20. In the embodiment shown, internal combustion engine 10 includes two exhaust manifolds 18 and 20, with combustion cylinders C1–C3 being associated with exhaust manifold 18 as indicated by dashed lines 22 and combustion cylinder C4–C6 being associated with exhaust manifold 20 as indicated by dashed lines 24. However, it will be appreciated that internal combustion engine 10 may be provided with a different number of exhaust manifolds, such as a single exhaust manifold in communication with each of combustion cylinders C1–C6.

Exhaust gas recirculation system 12 generally includes a turbocharger 26, mixer 28 and controller 30. Turbocharger 26 includes a turbine 32, a first compressor 34 and a second compressor 36. Turbine 32 receives exhaust gas from exhaust manifolds 18 and 20 and is rotatably driven thereby. Turbine 32 includes an output shaft 38 which rotatably drives first compressor 34 and second compressor 36, as indicated by arrow 40. Turbine 32 includes a controllably actuatable variable intake nozzle 42 with a constriction diameter which may be controllably adjusted to thereby provide an inlet orifice to turbine 32 with a varying diameter. By varying the diameter of intake nozzle 42, the flow rate through turbine 32 is controlled, which in turn controls the rotational output speed of output shaft 38. The exhaust gas which drives and exits from turbine 32 flows to muffler 43 and then to the ambient environment.

First compressor 34 is rotatably driven by output shaft 38 and has an inlet 44 which receives combustion air from the ambient environment. First is compressor 34 also includes an outlet 46 through which the compressed combustion air flows. The compressed combustion air is typically substantially heated by first compressor 34 as a result of the work performed thereon and the energy imparted thereto. Accordingly, the compressed combustion air which flows from outlet 46 is cooled using an air-to-air aftercooler (ATAAC) 48 disposed downstream from first compressor 34.

Second compressor 36 receives exhaust gas from each exhaust manifold 18 and 20 in a parallel manner via fluid conduits 50. A heat exchanger 52 interconnects exhaust manifolds 18 and 20 with second compressor 36 to cool the exhaust gas prior to inlet 54 of second compressor 36. Second compressor 36 compresses the cooled exhaust gas received at inlet 54 and discharges the compressed exhaust gas through outlet 56.

Mixer 28 receives the compressed and cooled combustion air from first compressor 34 and the compressed exhaust gas from second compressor 36. Mixer 28 is configured to mix the exhaust gas from second compressor 36 with the combustion air from first compressor 34. Mixer 28 may be, e.g., a mixing vessel, an induction venturi or a simple T-junction. The mixture of combustion air and exhaust gas flows from mixer 28 to intake manifold 14 via fluid conduit 58.

Controller 30 is connected with variable intake nozzle 42 via line 60 and controllably actuates variable intake nozzle 42 to control the flow rate of exhaust gas through turbine 32 and thus the rotational speed of output shaft 38. More particularly, controller 30 controls operation of variable intake nozzle 42, dependent upon an operating characteristic associated with second compressor 36. To this end, controller 30 is connected with a sensor 62 and/or sensor 64. Sensor 64 senses a flow rate of exhaust gas flowing into second compressor 36, and is thus directly related to an operating characteristic associated with second compressor 36. On the other hand, sensor 62 senses an operating characteristic associated with internal combustion engine 10, and thus is indirectly associated with an operating characteristic of second compressor 36 via empirical or theoretical determinations. For example, sensor 62 may sense an engine load condition, an engine coolant temperature, a combustion air inlet temperature or an engine start-up condition. Each of these parameters may be empirically related to a desired amount of exhaust gas which is to be compressed by second compressor 36 and provided to mixer 28 for exhaust gas recirculation. Other sensed operating parameters associated with internal combustion engine 10 may also be related to the amount of exhaust gas which is to be compressed by second compressor 36. By varying the constriction diameter of variable intake nozzle 42 dependent upon an operating characteristic of second compressor 36, the rotational speed of second compressor 36 and thus the amount of exhaust gas which is compressed by second compressor 36 is also controlled.

Controller 30 is also electrically connected with a pair of controllably actuatable valves 66 via lines 68. Each valve 66 is respectively associated with an exhaust manifold 18 or 20. Valves 66 are controlled by controller 30, dependent upon an output signal from sensor 62 and/or sensor 64. Under most operating conditions, valves 66 are maintained in an open state so that the output flow rate from second compressor 36 is controlled by controlling the constriction diameter of variable intake nozzle 42. However, under certain operating conditions, such as certain load conditions, it is possible that variable intake nozzle 42 may not effectively control the operation of second compressor 36. For example, under certain operating conditions, it may be desirable to completely shut off exhaust gas recirculation, in which case controller 30 controllably actuates valves 66 to close valves 66 and thus provide an effective zero flow rate from second compressor 36. Moreover, it may be desirable under certain engine operating conditions to provide a reduced or pulsed exhaust gas recirculation, in which case controller 30 controllably actuates valve 66 on a timed basis. Other control logic of valve 66 is also possible, dependent upon specific engine operating conditions.

INDUSTRIAL APPLICABILITY

During use, a fuel and air mixture is injected into each combustion cylinder C1–C6 in a timed manner in known fashion. Exhaust gas from combustion cylinder C1–C6 flows into a respective exhaust manifold 18 or 20. The exhaust gas from each exhaust manifold 18 and 20 flows in a parallel manner to turbine 32 of turbocharger 26. Variable intake nozzle 42 is controlled with controller 30 to control the flow rate into turbine 32 and thus the rotational speed of output shaft 38. Controller 30 also controllably actuates valves 66 to allow a flow of exhaust gas via fluid conduits 50 to heat exchanger 52 and second compressor 36. Second compressor 36 rotates at a speed which is the same as first compressor 34. However, the flow rate through first compressor 34 and second compressor 36 is a function of the density of the fluid medium received at inlet 44 and inlet 54, respectively. Since first compressor 34 receives combustion air from the ambient environment, the density of the combustion air remains substantially constant during operation of internal combustion engine 10. On the other hand, the density of the exhaust gas received at inlet 54 varies to a much greater extent because of load conditions, engine start-up conditions, engine temperatures, etc. Thus, although the rotational speed of first compressor 34 and second compressor 36 is substantially the same, the flow rate through second compressor 36 can vary substantially from the flow rate through first compressor 34. Controller 30 is coupled with a sensor 62 and a sensor 64 and receives input signals therefrom. Dependent upon the received input signals from sensors 62 and/or 64, controller 30 outputs a signal via line 60 to control the constriction diameter of variable intake nozzle 42 and thus control the rotational speed of output shaft 38 which drives first compressor 34 and second compressor 36. Accordingly, the amount of exhaust gas which is mixed with the combustion air entering mixer 28 can be varied by varying the constriction of variable intake nozzle 42. The mixed combustion air and exhaust gas mixture is then transported to intake manifold 14 via fluid conduit 58. In the event that an engine operating condition exists which necessitates that no exhaust gas be recirculated, controller 30 closes valves 66 so that only combustion air flows through fluid conduit 58.

The present invention provides an exhaust gas recirculation system with a turbocharger having a variable intake nozzle 42 which is controlled via a controller 30, dependent upon an operating characteristic of second compressor 36. The amount of exhaust gas which is mixed with the combustion air can thus be controlled utilizing the same controller 30 which controls the constriction diameter of variable intake nozzle 42. Additionally, the flow of exhaust gas can be shut off or can be supplementally controlled utilizing controllable valves 66 which are also coupled with and controlled by controller 30. Rather than utilizing auxiliary bypass or control systems for the exhaust gas and/or combustion air, the amount of exhaust gas which is mixed with the combustion air can be simply and reliably controlled by controlling the constriction diameter of variable intake nozzle 42.

Other aspects, objects and advantages of this invention can be obtained from a study of the drawings, the disclosure and the appended claims.

What is claimed is:

1. An internal combustion engine, comprising:
   at least one exhaust manifold;
   at least one intake manifold;
   a turbocharger including a turbine, a first compressor and a second compressor, said turbine connected with said exhaust manifold and having a controllable variable nozzle, said first compressor and said second compressor each being connected with and driven by said turbine, said first compressor having an inlet for receiving combustion air and an outlet, said second compressor having an inlet connected with each said exhaust manifold and an outlet;
   a mixer interconnecting said first compressor outlet and said second compressor outlet with said intake manifold;
   at least one sensor, each said sensor for sensing an operating characteristic associated with said second compressor and providing an output signal indicative thereof, one said sensor being a flow sensor adapted to sense a flow rate through said second compressor; and
   a controller connected with each said sensor and said turbine variable nozzle, said controller controlling operation of said turbine variable nozzle, dependent upon at least one said output signal, each said output signal indicative of one said operating characteristic associated with said second compressor.

2. The internal combustion engine of claim 1, further comprising a second said sensor, said second said sensor sensing at least one of an engine load condition, engine coolant temperature, combustion air inlet temperature, and an engine start-up condition.

3. The internal combustion engine of claim 1, wherein said variable nozzle comprises a variable intake nozzle.

4. The internal combustion engine of claim 1, wherein said at least one exhaust manifold comprises two exhaust manifolds.

5. The internal combustion engine of claim 1, further comprising at least one controllable valve, each said controllable valve fluidly interconnecting a corresponding said exhaust manifold with said second compressor inlet, said controller connected with and controlling operation of each said valve.

6. The internal combustion engine of claim 1, further comprising a heat exchanger connected with said second compressor inlet.

7. The internal combustion engine of claim 6, wherein said heat exchanger interconnects each said controllable valve with said second compressor inlet.

8. The internal combustion engine of claim 1, further comprising an aftercooler interconnecting said first compressor outlet with said mixer.

9. The internal combustion engine of claim 1, wherein said mixer comprises one of a mixing vessel, an induction venturi and a T-junction.

10. An exhaust gas recirculation system in an internal combustion engine, the internal combustion engine including an exhaust manifold and an intake manifold, said exhaust gas recirculation system comprising:
    a turbocharger including a turbine, a first compressor and a second compressor, said turbine configured for connection with the exhaust manifold and having a controllable variable nozzle, said first compressor and said second compressor each being connected with and driven by said turbine, said first compressor having an inlet for receiving combustion air and an outlet, said second compressor having an inlet configured for connection with the exhaust manifold and an outlet;
    a mixer connected with each of said first compressor outlet and said second compressor outlet;
    at least one sensor, each said sensor for sensing an operating characteristic associated with said second compressor and providing an output signal indicative thereof, one said sensor being a flow sensor adapted to sense a flow rate through said second compressor; and
    a controller connected with each said sensor and said turbine variable nozzle, said controller controlling operation of said turbine variable nozzle, dependent upon at least one said output signal, each said output signal indicative of one said operating characteristic associated with said second compressor.

11. The exhaust gas recirculation system of claim 10, further comprising a second said sensor, said second said sensor sensing at least one of an engine load condition, engine coolant temperature, combustion air inlet temperature, and an engine start-up condition.

12. The exhaust gas recirculation system of claim 10, wherein said variable nozzle comprises a variable intake nozzle.

13. The exhaust gas recirculation system of claim 10, further comprising at least one controllable valve, each said controllable valve configured for fluidly interconnecting a corresponding exhaust manifold with said second compressor inlet, said controller connected with and controlling operation of each said valve.

14. A method of operating an exhaust gas recirculation system in an internal combustion engine, comprising the steps of:

providing an exhaust manifold and an intake manifold;

providing a turbocharger including a turbine, a first compressor and a second compressor, said turbine configured for connection with the exhaust manifold and having a controllable variable nozzle, said first compressor and said second compressor each being connected with and driven by said turbine, said first compressor having an inlet for receiving combustion air and an outlet, said second compressor having an inlet connected with the exhaust manifold and an outlet;

providing at least one sensor, each said sensor for sensing an operating characteristic associated with said second compressor and providing an output signal indicative thereof, one said sensor being a flow sensor adapted to sense a flow rate through said second compressor;

providing a controller connected with said turbine variable nozzle and each said sensor;

flowing exhaust gas from said exhaust manifold to each of said turbine variable nozzle and said second compressor inlet;

sensing at least one said operating characteristic associated with said second compressor, each said sensor sensing one said operating characteristic associated with said second compressor;

providing at least one output signal, each said output signal provided by a respective said sensor, each said output signal indicative of one said operating characteristic associated with said second compressor; and controlling operation of said turbine variable nozzle, dependent upon at least one said output signal.

15. The method of claim 14, further comprising a second said sensor, said second said sensor sensing at least one of an engine load condition, engine coolant temperature, combustion air inlet temperature, and an engine start-up condition.

16. The method of claim 14, wherein said variable nozzle comprises a variable intake nozzle.

* * * * *